(12) United States Patent
Chen et al.

(10) Patent No.: US 10,346,235 B2
(45) Date of Patent: Jul. 9, 2019

(54) IDENTIFYING ORIGIN AND DESTINATION PAIRS

(71) Applicant: INTERNATIONAL BUSINESS MACHINES CORPORATION, Armonk, NY (US)

(72) Inventors: Hao Chen, Beijing (CN); Feng Li, Beijing (CN); Qi Cheng Li, Beijing (CN); Shao Chun Li, Beijing (CN); Fang Quan Xie, Fu Zhou (CN); Xin Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 14/880,407

(22) Filed: Oct. 12, 2015

(65) Prior Publication Data

US 2016/0124791 A1    May 5, 2016
US 2018/0018214 A9    Jan. 18, 2018

(30) Foreign Application Priority Data

Oct. 30, 2014    (CN) .......................... 2014 1 0599389

(51) Int. Cl.
*G06F 11/00*    (2006.01)
*G06F 11/07*    (2006.01)
(Continued)

(52) U.S. Cl.
CPC ...... *G06F 11/0787* (2013.01); *G01C 21/3617* (2013.01); *G06F 11/0745* (2013.01);
(Continued)

(58) Field of Classification Search
CPC ............. G06F 11/0787; G06F 11/0745; G06F 11/0751; G06F 11/0793; G06F 16/29;
(Continued)

(56) References Cited

U.S. PATENT DOCUMENTS 6,494,369 B1    12/2002    Kikuchi
6,708,878 B2    3/2004    Eguchi et al.
(Continued)

FOREIGN PATENT DOCUMENTS

CN    101295326 A    10/2008
CN    102324128 B    5/2011
(Continued)

OTHER PUBLICATIONS

Li et al., "Estimating a Transit Passenger Trip Origin-Destination Matrix Using Automatic Fare Collection System", (c) Springer-Verlag Berlin Heidelberg 2011; DASFAA Workshops 2011, LNCS 6637, 2011; pp. 502-513 (Year: 2011).*
(Continued)

*Primary Examiner* — Anthony J Amoroso
(74) *Attorney, Agent, or Firm* — Cantor Colburn LLP; Grant Johnson

(57) ABSTRACT

The present disclosure relates to identifying an origin/destination pair. Aspects include identifying an origin/destination pair in a service, which includes determining a current time when the current operation is executed in response to failure of a current operation for recording an origin/destination pair. Aspects also include determining a previous time when a last operation was executed for recording an origin/destination pair and identifying a missing point causing failure of the current operation based on a time interval between the current time and the previous time.

8 Claims, 2 Drawing Sheets

(51) Int. Cl.
  *G01C 21/36* (2006.01)
  *H04L 29/08* (2006.01)
  *G06Q 50/30* (2012.01)

(52) U.S. Cl.
  CPC ...... *G06F 11/0751* (2013.01); *G06F 11/0793* (2013.01); *G06Q 50/30* (2013.01); *H04L 67/22* (2013.01)

(58) Field of Classification Search
  CPC ..... G06F 16/635; G06F 16/9537; G07C 1/00; G07C 1/06; G07C 1/14; G07C 1/16; G07C 1/18; G07C 9/00722; G07C 9/02; G07C 9/025; G06Q 10/087; G06Q 10/02; G06Q 10/0875; G06Q 50/30; G01C 21/34; G01C 21/343; G01C 21/3407; G01C 21/3476; G01C 21/3492; G01C 21/3605; G01C 21/3617; G01C 21/3679; H04L 67/22; G06N 5/042; G06N 5/048
  See application file for complete search history.

(56) References Cited

U.S. PATENT DOCUMENTS

| | | | |
|---|---|---|---|
| 2003/0040944 | A1 | 2/2003 | Hileman |
| 2013/0317742 | A1* | 11/2013 | Ulloa Paredes ..... G06Q 10/063 701/533 |
| 2013/0317884 | A1* | 11/2013 | Chidlovskii ......... G06Q 10/063 705/7.31 |
| 2015/0294430 | A1* | 10/2015 | Huang .................. G06Q 50/26 705/7.24 |

FOREIGN PATENT DOCUMENTS

| | | |
|---|---|---|
| CN | 102097002 A | 6/2011 |
| CN | 102289932 A | 12/2011 |
| CN | 102819885 A | 12/2012 |
| CN | 103198104 A | 3/2013 |

OTHER PUBLICATIONS

Ma, Xiaolei, Yao-Jan Wu, Yinhai Wang, Feng Chen, and Jianfeng Liu. "Mining smart card data for transit riders' travel patterns." Transportation Research Part C: Emerging Technologies 36 (2013): 1-12. (Year: 2013).*

Hao Chen, et al., Pending U.S. Appl. No. 14/967,635 entitled "Identifying Origin and Destination Pairs ," filed Dec. 14, 2015.

List of IBM Patents or Patent Applictions Treated as Related; (Appendix P), Filed Jan. 28, 2016, 2 pages.

Li et al., "Estimating a Transit Passenger Trip Origin-Destination Matrix Using Automatic Fare Collection System", (c) Springer-Verlag Berlin Heidelberg 2011; DASFAA Workshops 2011, LNCS 6637, 2011; pp. 502-513.

Munizaga et al., Estimation of a disaggregate multimodal public transport Origin-Destination matrix from passive smartcard data from Santiago, Chile; Transportation Research Part C 24 (2012) 9-18.

Chinese Office Action search report for CN Application No. 2014105993896; dated Aug. 7, 2017; 2 pgs.

* cited by examiner

IDENTIFYING ORIGIN AND DESTINATION PAIRS

FOREIGN PRIORITY

This application claims priority to Chinese Patent Application No. 201410599389.6 filed Oct. 30, 2014; and all the benefits accruing therefrom under 35 U.S.C. § 119, the contents of which in its entirety are herein incorporated by reference.

BACKGROUND

Embodiments of the present invention relate to a method and apparatus for identifying origin/destination pairs.

In many services, it is needed to collect information about an origin/destination pair. For example, integrated circuit (IC) cards have been widely applied in public transportation services such as bus and subway. In use, a user has to swipe card at a start station (origin) and a destination station (destination) so as to generate origin/destination pair information. Based on such pair information, various operations such as charging, route statistics and analysis may be performed to the user. For another example, in expressway management, electronic road pricing (ERP) is also required to provide an intelligent traffic management based on origin/destination pair information. For example, in a parking management, information about checking in/out of a parking lot should generally be required to record, which may also be regarded as a kind of origin/destination pair information.

However, during actual use, due to technical reasons such as IC card fault, POS machine fault, and communication fault, as well as artificial reasons such as subjective negligence, etc., loss of origin or destination information might be incurred. In this case, it will cause service failure. For example, in a public transportation system, when a user swipes card at the destination, if the origin information is lost, agate at a terminal will not be opened. Traditionally, this problem needs to be solved in a manual manner, which will bring various inconveniences to the user per se, other users and the service provider, particularly at rush time of the service. The same problem also exists in other services such as an ERP service and a parking management service.

SUMMARY

In one aspect of the present invention, there is provided a method for identifying an origin/destination pair in a service. The method comprises: in response to failure of a current operation for recording an origin/destination pair, determining a current time when the current operation is executed; determining a previous time when a last operation for recording an origin/destination pair was executed; and identifying a missing point causing failure of the current operation based on a time interval between the current time and the previous time.

In another aspect of the present invention, there is provided an apparatus for identifying an origin/destination pair in a service. The apparatus includes a current time determining unit configured to, in response to failure of a current operation for recording an origin/destination pair, determine a current time when the current operation is executed. The apparatus also includes a previous time determining unit configured to determine a previous time when a last operation for recording an origin/destination pair was executed and a missing point identifying unit configured to identify a missing point causing failure of the current operation based on a time interval between the current time and the previous time.

In another aspect of the present invention, there is provided a computer program product for identifying an origin/destination pair in a service, the computer program product including a non-transitory storage medium readable by a processing circuit and storing instructions for execution by the processing circuit for performing a method. The method includes determining a current time when a current operation is executed in response to a failure of the current operation for recording the origin/destination pair associated with a user. The method also includes determining a previous time when a last operation for recording the origin/destination pair was executed and identifying a missing point causing the failure of the current operation based on a time interval between the current time and the previous time.

BRIEF DESCRIPTION OF THE DRAWINGS

Through the more detailed description of some embodiments of the present disclosure in the accompanying drawings, the above and other objects, features and advantages of the present disclosure will become more apparent, wherein.

DETAILED DESCRIPTION

Exemplary embodiments will be described in more detail with reference to the accompanying drawings, where the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

According to embodiments of the present invention, a user's historical operation records or location/movement information within a past period of time may be flexibly utilized based on a time interval between a user's current operation and the last recorded operation, so as to automatically identify a missing point in an origin/destination pair. Embodiments of the present invention can accurately identify a missing point in a full automatic way, thereby enhancing service efficiency and user experience. Other features and advantages of the present invention will become easily comprehensible through the description below.

Figure 1:
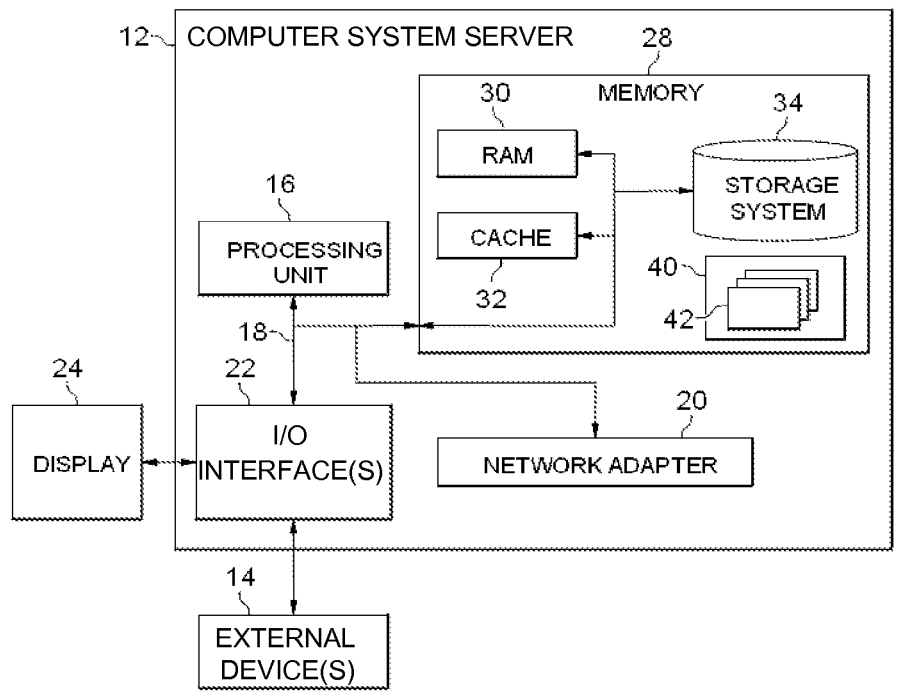
FIG. 1 shows an example computer system/server which is applicable to implement embodiments of the present invention.

Referring now to FIG. 1, where an example computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
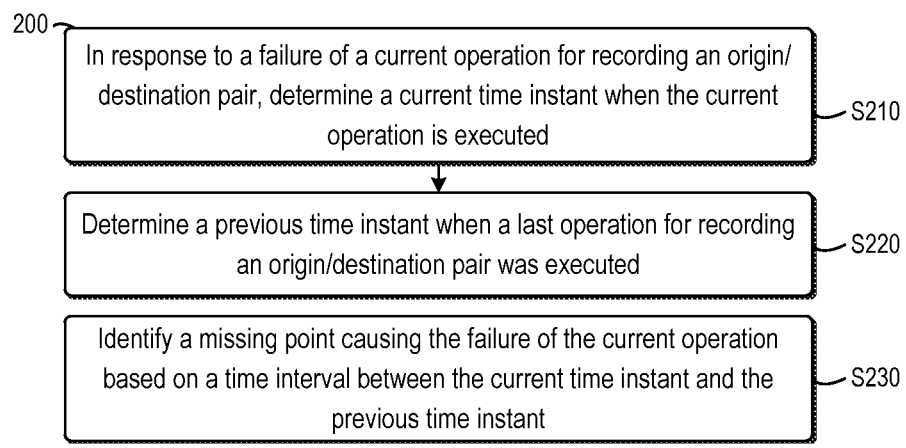
FIG. 2 shows a schematic flowchart of a method for identifying a missing point in an origin/destination pair according to embodiments of the present invention.

FIG. 2 shows a schematic flowchart of a method 200 for identifying a missing point in an origin/destination pair according to embodiments of the present invention. In one embodiment, the method 200 may be implemented by a client device in charge of interacting with a terminal device used by the user. For example, in a public transportation management system, the user's terminal device may be a device such as a dedicated or general IC card or mobile phone or the like. At this point, the method 200 may be implemented by a gate in charge of interacting with the terminal device.

In particular, at the ease of discussion, in the description below, a check-in/check-out management system in a public transportation system will be mainly referenced as an example. Correspondingly, the IC card will be described as an example of a terminal device, and the gate will be described as an example of a client. However, it would be appreciated that they are only example, not intended to limit the scope of the present invention in any manner. Embodiments of the present invention may be applicable for any other appropriate fields such as road management, tolling, parking lot management and the like.

The method 200 starts in step S210, where in response to a failure of current operation for recording an origin/destination pair, the time when a current operation is executed is determined. In the context of the present disclosure, an operation for recording an origin/destination pair is an interactive operation which is performed between a terminal device of a user and a client device and which is capable of recording origin or destination information in order to form an interactive operation of an origin/destination pair.

As an example, when checking in/out a bus station with an IC card, the user may perform a "card swiping" operation. In other words, the user places the IC card at a location close enough to a sensing area of a gate, such that the gate can read information in the IC card. The gate may identify a user's identity through the read information, record the user's check-in/check-out information, and transmit user information to a backend server, etc. In this point, the card swiping operation is an operation for recording an origin/destination pair. In other applications, any other form of operation for recording an origin/destination pair is possible.

According to embodiments of the present invention, a service provider requires paired appearance of the origin and destination so as to form an origin/destination pair. Otherwise, the user's operation will fail. Specifically, in one embodiment, the gate only allows a user to pass unidirectionally. For example, a gate arranged at an entry of a bus station only allows a user to enter into a bus station, while a gate arranged at an exit of a bus station only allows a user to leave the bus station. Each time when the user performs a card swiping operation, the gate will record whether the user performs an operation at an exit or at an entry. A plurality of card swiping records of the user may be stored in an IC card in a temporal order.

Therefore, in such an embodiment, when the user swipes card at an entry gate, the gate will read the user's last card swiping record from the user's IC card. If the entry gate finds that the last card swiping is also performed at an entry gate, it is determined that a missing point exists in the origin/destination pair and the type of the missing point is destination.

Likewise, when the user swipes card at an exit gate, the gate will read the user's last card swiping record from the user's IC card. If the exit gate finds that the last card swiping is also performed at an exit gate, it is determined that a missing point exists in the origin/destination pair and the type of the missing point is entry.

In response to detecting that a missing point exists in the origin/destination pair, in step S210, the gate may determine the execution time of the current recording operation (e.g., a card swiping operation). In one embodiment, a gate for executing the method 200 may be equipped with a clock. In this embodiment, the gate may directly read the current time. Alternatively, in other embodiments, the gate may also obtain the current time from other device such as a backend server.

The method 200 proceeds to step S220, where a time when the last operation for recording the origin/destination pair was performed by a user is obtained. As mentioned above, in one embodiment, information regarding a predetermined number of previous card swiping actions executed by the user may be stored in an IC card. In such an embodiment, the gate may read the time of last card swiping from the IC card. Alternatively or additionally, for example, when the IC card fails or the storage resource is limited, such information may also be saved in a backend server of the system. Accordingly, the gate may communicate with a backend server and obtains the time of the last card swiping performed by the current user.

In step S230, a missing point causing the failure of the current operation for recording the origin/destination pair is identified based on a time interval between the current time of the current operation obtained in step S210 and the previous time of the last operation obtained in step S220.

Generally, according to embodiments of the present invention, there are at least two kinds of information that may be used for identifying or predicting a missing origin or destination. The first kind of information is historical information about the user's origins and destinations, particularly those representative records, i.e., popular origins and destinations. Another kind of information is the user's location/movement information within a specific period of time obtained through technical means such as location sensing. Any kind of the two kinds of information may be used for estimating a missing origin or destination.

In order to enhance the accuracy of identifying a missing point, according to embodiments of the present invention, in step S230, it is determined which one of the historical information about the popular origins and destinations and the user's location/movement information is more advantageous for prediction accuracy based on the current operation time and the last operation time. Generally, a reasonable assumption is that a longer time interval indicates a strong regularity, while a shorter time interval indicates stronger timeliness. Therefore, in one embodiment, if the time interval is greater than a predefined adjustable threshold, it may be believed that the historical information regarding popular origins and destinations is dominant. Otherwise, if the time interval is less than a threshold, it may be believed that the user's recent activities are dominant.

Figure 3:
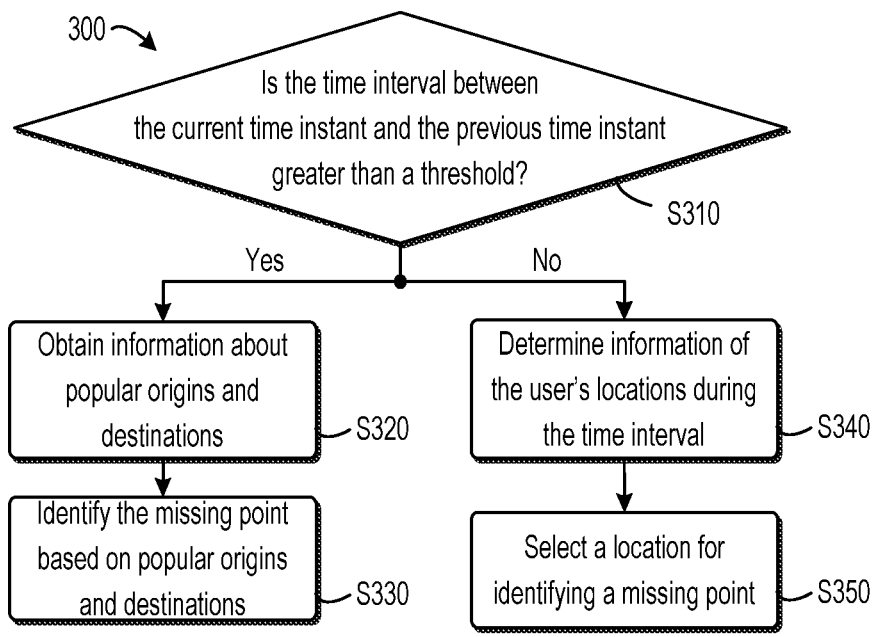
FIG. 3 shows a schematic flowchart of a method for identifying a missing point in an origin/destination pair according to embodiments of the present invention.

Reference is now made to FIG. 3 where a schematic flowchart of a method 300 for identifying a missing point in an origin/destination pair based on a time interval between the current operation time and the last operation time is shown. It would be appreciated that the method 300 is an example implementation of step S230 in the method 200.

In step S310, it is determined whether the time interval between the time of the current operation as obtained in step S210 and the time of the last operation as obtained in step S220 is greater than a threshold. The threshold may be preset and may also be adjusted during use process.

If the time interval is greater than a threshold (branch "yes"), it is believed that the user's historical information about origins and destinations plays a dominant role in identifying a missing point. In this case, the method 300 proceeds to step S320, where information about popular origins and destinations associated with the user is obtained. The popular origins and destinations are obtained through performing statistics and analysis to the user's historical origin and destination information.

At the ease of discussion, an example of a public transportation management system is still used. The user's entry and exit card swiping records may be stored in a corresponding gate; moreover, the most recent several records may be temporarily stored in the user's IC card. The gate may periodically send the user's card swiping records to the backend server. Therefore, the backend server may obtain the user's previous origin and destination information. The backend server may analyze these historical data, thereby finding the origins and destinations frequently used by the user, i.e., popular origins and destinations. According to embodiments of the present invention, each popular origins and destinations have an associated time which indicates a time when the user arrives at the corresponding point.

Moreover, in one embodiment, a common pattern for origins and destinations may be determined through analysis. Specifically, a common pair relationship between origins and destinations may be determined. For example, if it is found through statistics that the user always checks in from Station A at a certain time and checks out from Station B at a subsequent specific time, it may be believed that pair "A/B" is a common origin/destination pair. Additionally, different common origin/destination pairs may be assigned different priorities. For example, each origin/destination pair may be determined based on their respective appearance frequencies.

Additionally, in one embodiment, information about popular origin and destination may be extracted according to different dimensions (including a pattern of a popular origin/destination pair). For example, in one embodiment, information about the popular origin and destination may be extracted based on a time dimension. As an example, in one embodiment, work days (e.g., Monday-Friday) and rest days (e.g., Saturday to Sunday) may be counted separately. In this way, information about the user's popular origins and destinations in work days may be obtained. Similarly, the information about the user's popular origins and destinations in rest days may be obtained.

In one embodiment, the time dimension is not necessarily partitioned by work days and rest days. For example, the user may designate partition of time dimensions. For example, the user may indicate: counting popular origin/destination pairs in Monday-Wednesday and Thursday-Sunday separately. Additionally, in addition to or supplemental to time dimension, other dimensions may be used. As an example, in one embodiment, a territory dimension may be used. For example, popular origins and destinations information in different territories is counted separately. As will be described hereinafter, such extraction of popular origin and destination information based on different dimensions is advantageous to accuracy of identifying a missing point.

According to embodiments of the present invention, any currently known or future developed data analysis and/or mining technology may be used in combination with embodiments of the present invention. The scope of the present invention is not limited in this aspect.

In step S320, information about the user's popular origins and destinations within a past period of time may be obtained in any appropriate manner. For example, in one embodiment, the backend server may replicate the extracted information about popular origins and destinations to the user's IC card at an appropriate time. For example, when the user goes to a location specified by a service provider to complete a specific task (e.g., fee payment), the information about the popular origin and destination will be replicated from the backend server to the IC card. In such an embodiment, the gate may directly read information regarding the popular origins and destinations from the user's IC card. According to embodiments of the present invention, the popular origins and destinations are sorted according to the priority or time.

Alternatively or additionally, in response to failure in the user's card swiping operation, the gate may communicate with the backend server and requests information about popular origins and destinations associated with the user. As a response, the backend server may return information about popular origins and destinations to the gate. The communication between the gate and the backend server may be implemented by virtue of any currently known or future developed communication medium.

Next, in step S330, a missing point causing failure of the current card swiping operation may be identified based on the obtained information about the popular origins and destinations. In one embodiment, in step S330, a point of the same type as the missing point with the associated time prior to the time of the current operation may be selected from the popular origins and destinations as the missing point.

The type of the missing point indicates whether the point missing in the origin/destination pair is an origin point or a destination point. As mentioned above, in a public transportation management system, each gate is arranged at an exit or entry of a bus station. Therefore, if the user fails in an attempt to swipe card at the exit gate, it may be determined that the missing previous point is the start point. Otherwise, if the user fails in swiping card at an entry gate, it may be determined that the missing previous point is destination.

Consider a specific example. Suppose the user fails in swiping card at an exit gate of a bus station at 10:00 AM. Then, it may be determined that the time of the current operation is 10:00 AM, and the missing point is an origin. In this case, a popular origin may be selected from the popular origins and destinations obtained in step S320, such that the associated time of the popular origin is before 10:00 AM. The selected popular origin may be determined as a missing point. It would be appreciated that this process is likely applicable to the case where the missing point is a destination.

Alternatively, in one embodiment, the information about a popular origin/destination pair included in the information obtained in step S320 may be taken into consideration. Specifically, in such an embodiment, based on the time of the current operation and the type of the missing point, a reference origin/destination pair matching the current operation may be selected from a popular origin/destination pair. The term "match" used here refers to the matching in terms of time and location. A specific example will be described infra. If there are a plurality of matching popular origin/destination pairs, then selection may be made based on the priority of each pair. Other selection mechanism is also feasible, e.g., random selection. Afterwards, the missing point may be identified based on the selected reference origin/destination pair.

In the following, the cases where the missing origin and the missing destination will be discussed separately. First, consider the case of the missing point being an origin. Suppose the user fails in swiping card at an exit of the bus station A at 8:00 AM. Then, the current operation time is 8:00 AM, and the missing point is an origin. In this case, in popular origin/destination pairs associated with the user, a popular origin/destination pair with the destination being station A and the operation time being around 8:00 AM may be searched as the reference origin/destination pair. In response to finding such reference origin/destination pair, the origin in the pair may be determined as the missing point.

On the other hand, if the missing point is a destination, then an origin matching the user's current location and the time of the current operation may be searched in popular origin/destination pairs. For the purpose of discussion, suppose the user fails in swiping card at an entry of the bus station B at 6:10 PM. Then, the time of the current operation is 6:10 PM, and the missing point is the destination. In this case, in popular origin/destination pairs associated with the user, an origin/destination pair whose origin is station B and operation time is around 6:10 PM may be searched as a reference origin/destination pair. In response to finding such reference origin/destination pair, the last popular destination temporally adjacent to the origin in the reference origin/destination may be determined as a missing point.

In particular, as mentioned above, in one embodiment, the information about popular origins and destinations may be extracted based on different dimensions. In such an embodiment, when selecting a reference origin/destination pair, the dimensional information may also be taken into consideration. With the temporal dimension as an example, it may be determined whether the current date is a work day or a rest day. If the current date is a work day, the search may only be performed in the popular origins and destinations for the work day; if the current date is a rest day, search may be performed only in popular origins and destinations for the rest day. In this way, the accuracy of identifying can be significantly enhanced.

If it is determined in step S310 that the time interval between the current operation time and the time of the last operation is less than a predetermined threshold, it is believed that the user may be in a continuous activity. Correspondingly, the role played by regularity might not be as significant as timeliness. Therefore, a missing point may be identified based on the user's location/movement information.

To this end, the method 300 proceeds to step S340, where one or more locations reached by the user during the time interval between the time of the current operation and the time of the last operation are determined. According to embodiments of the present invention, each location determined here corresponds to one potential origin and/or destination of the service. For example, in the public transportation management system, it may be ensured that a client device such as a gate exists in a predetermined neighboring domain of each determined location.

The user's location information may be obtained through various manners. For example, in one embodiment, the user's location information may be obtained based on a global satellite positioning (GPS) system on the user's mobile phone or other portable device. Alternatively or additionally, any appropriate positioning technology such as a cellular network positioning technology may also be used. The scope of the present invention is not limited in this aspect.

Next, in step S350, a location is selected from the locations determined in step S340, and a missing point is identified based on the selected location. Location selection is performed at least based on a type of a missing point. Specifically, if the missing point is an origin, then the selected location should correspond to the origin, e.g., having an entry gate; otherwise, if the missing point is a destination, the selected location should correspond to a destination, e.g., having an exit gate. If there are a plurality of candidate locations, in one embodiment, a location closest in time may be selected from the candidate locations, and a potential origin or destination corresponding to the location is determined as a missing point (it depends on the type of the missing point).

In order to further enhance the accuracy of missing point identification, in step S350, the location of the user's last operation may also be taken into consideration. Specifically, in one embodiment, a location whose distance from the location where the last operation was executed is less than a predetermined threshold may be selected from the one or more locations. As an example, suppose the user fails in swiping card to check out of the bus station A, and the last card swiping is an exit card swiping performed at the bus station B. At this point, it may be determined whether a location C whose distance from the station B is less than a predetermined distance exists in the determined plurality of candidate locations, and the location C is arranged with an entry gate nearby. In the case of existence, it may be inferred that abnormality likely occurs when checking in at location C to station A after the user checks out of the bus station B. therefore, the origin corresponding to location C may be determined as a missing point.

The principle and mechanism of the present invention has been described above with reference to a plurality of example embodiments. It should be understood that the embodiments as described above are only example, not intended to limit the scope of the present invention in any manner. Based on the teaching and inspiration provided here, those skilled in the art can envisage any possible transformations or amendments. For example, in the above description, the origin/destination pair is described as a location pair, i.e., an origination location/termination location pair. However, the scope of the present invention is not limited thereto. Alternatively or additionally, the origin/destination pair may be a pair of originating time/termination time.

For example, in parking lot or building management, when it is found an originating time of entry into the parking lot or building or a termination time of exit from the parking lot or building misses, its behavior habit may be inferred based on the user's historical data, thereby completing identification of the missing originating or termination time. As an example, suppose card swiping error occurs when the user attempts to swipe card to check out of the parking lot at 18:10 PM. In this case, the missing point is the originating time when the user entered into the parking lot. In one embodiment, the user's historical (popular) origin/destination information can be obtained and analyzed. If it is found that the user frequently checks in the parking lot at around 7:30 AM and checks out of the parking lot at around 18:00 PM, 7:30 AM may be determined as the missing originating time point.

Figure 4:
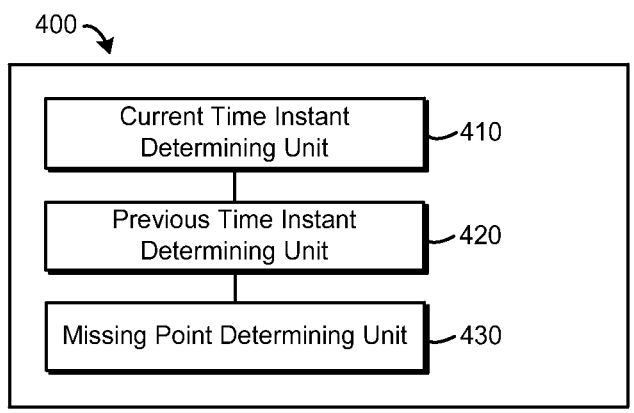
FIG. 4 shows a schematic block diagram of an apparatus for identifying a missing point in an origin/destination pair according to embodiments of the present invention.

FIG. 4 shows a schematic block diagram of an apparatus for identifying a missing point in an origin/destination pair according to embodiments of the present invention. As shown in the figure, the apparatus 400 comprises a current time determining unit 410 configured to, in response to failure of a current operation for recording an origin/destination pair associated with a user, determine a current time when the current operation is executed; a previous time determining unit 420 configured to determine a previous time when a last operation for recording an origin/destination pair was executed; and a missing point identifying unit 430 configured to identify a missing point causing the failure of the current operation based on a time interval between the current time and the previous time.

In one embodiment, the previous time determining unit 420 may comprise a first reading unit configured to read the previous time from a terminal device of the user.

In one embodiment, the missing point identifying unit 430 may comprise: a popular information obtaining unit configured to, in response to the time interval being greater than a predetermined threshold, obtain information about popular origins and destinations associated with the user, each popular origin or destination being associated with a time; and a first identifying unit configured to identify the missing point based on the information about popular origins and destinations.

In one embodiment, the popular information obtaining unit may comprise a second reading unit configured to read the information about popular origins and destinations from a terminal device of the user.

In one embodiment, the first identifying unit may comprise a missing point selecting unit configured to select, from among the popular origins and destinations, a point of a same type as the missing point with the associated time prior to the current time as the missing point, the type indicating whether the missing point is an origin or a destination.

In one embodiment, the information about popular origins and destinations associated with the user includes popular origin/destination pairs, and the first identifying unit may comprise: a reference pair selecting unit configured to select a reference origin/destination pair that matches the current operation from among the popular origin/destination pairs based on the current time and a type of the missing point, the type indicating whether the missing point is an origin or a destination; and a reference pair based identifying unit configured to identify the missing point based on the reference origin/destination pair.

In one embodiment, the reference pair based identifying unit may comprise: an origin identifying unit configured to determine an origin in the reference origin/destination pair as the missing point if the missing point is an origin; and a destination identifying unit configured to select a popular destination from among the popular origin/destination pairs as the missing point if the missing point is a destination, such that the time associated with the selected popular destination is immediately adjacent to the time associated with an origin in the reference origin/destination pair.

In one embodiment, the missing point identifying unit 430 may comprise: a location determining unit configured to, in response to the time interval being less than a predetermined threshold, determine one or more locations reached by the user during the time interval, each of the locations corresponding to a potential originating location or terminating location of the service; a location selecting unit configured to select a location from the one or more locations based on a type of the missing point, the type indicating whether the missing point is an originating location or a termination location; and a second identifying unit configured to determine the potential originating location or termination location corresponding to the selected location as the missing point.

In one embodiment, the location selecting unit may comprise: a distance based selecting unit configured to select a location from among the one or more locations, a distance between the selected location and a location where the last operation was executed being less than a predetermined threshold.

It should be noted that for the sake of clarity, FIG. 4 does not show optional units or sub-units included in the apparatus 400. All features and operations as described above are suitable for apparatus 400, respectively, which are therefore not detailed here. Moreover, partitioning of units or subunits in apparatus 400 is example, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 400 may be implemented by various manners, including software, hardware, firmware or a random combination thereof. For example, in some embodiments, the apparatus may be implemented by software and/or firmware. Alternatively or additionally, the apparatus 400 may be implemented partially or completely based on hardware. for example, one or more units in the apparatus 400 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for identifying a missing point in an origin/destination pair, the apparatus comprising:
   a processor coupled to a gate at a terminal, the processor configured to:
      identify a failure of a current operation for recording an origin/destination pair associated with a user, wherein the failure comprises a hardware fault or communication fault in a transportation management system;
      determine a current time when the current operation is executed;
      determine a previous time when a last operation for recording the origin/destination pair was executed; and
      automatically identify a missing point from the origin/destination pair causing the failure of the current operation based on a time interval between the current time and the previous time;
      in response to the time interval being greater than a predetermined threshold, obtain information about popular origins and destinations associated with the user, each popular origin or destination being associated with a time;
      wherein the information about popular origins and destinations associated with the user includes popular origin/destination pairs;
      select a reference origin/destination pair that matches the current operation from among the popular origin/destination pairs based on the current time and a type of the missing point, the type indicating whether the missing point is an origin or a destination;
      identify the missing point based on the reference origin/destination pair;
      in response to the missing point being a destination, select a popular destination from among the popular origin/destination pairs as the missing point, such that the time associated with the selected popular destination is immediately adjacent to the time associated with an origin in the reference origin/destination pair; and
      grant access at the gate at the terminal to the user based on identifying the missing point.

2. The apparatus according to claim 1, wherein the processor is further configured to read the previous time from a terminal device of the user.

3. The apparatus according to claim 1, wherein the processor is further configured to read the information about popular origins and destinations from a terminal device of the user.

4. The apparatus according to claim 1, wherein the processor is further configured to select, from among the popular origins and destinations, a point of a same type as the missing point with the associated time prior to the current time as the missing point, the type indicating whether the missing point is an origin or a destination.

5. The apparatus according to claim 1, wherein the processor is further configured to:
   in response to the missing point being an origin, determine an origin in the reference origin/destination pair as the missing point.

6. The apparatus according to claim 1, wherein the origin/destination pair is a pair of originating location/termination location, and wherein the processor is further configured to:
   in response to the time interval being less than a predetermined threshold, determine one or more locations reached by the user during the time interval, each of the locations corresponding to a potential originating location or terminating location of the service;
   select a location from the one or more locations based on a type of the missing point, the type indicating whether the missing point is an originating location or a termination location; and
   determine the potential originating location or termination location corresponding to the selected location as the missing point.

7. The apparatus according to claim 1, wherein the processor is further configured to select a location from among the one or more locations, a distance between the selected location and a location where the last operation was executed being less than a predetermined threshold.

8. A computer program product for identifying an origin/destination pair in a service, the computer program product comprising:
   a non-transitory storage medium readable by a processing circuit and storing instructions for execution by the processing circuit for performing a method comprising:

identifying, by the processing circuit coupled to a gate at a terminal, a failure of a current operation for recording an origin/destination pair associated with a user, wherein the failure comprises a hardware fault or communication fault in a transportation management system;

determining a current time in response to the failure of the current operation;

determining a previous time when a last operation for recording the origin/destination pair was executed; and automatically identifying, by the processing circuit, a missing point from the origin/destination pair causing the failure of the current operation based on a time interval between the current time and the previous time, wherein the automatically identifying comprises:

responsive to the time interval being greater than a predetermined threshold, obtaining information about popular origins and destinations associated with the user, wherein each popular origin or destination is associated with a time; and wherein each popular origin or destination includes historical travel data about the user, wherein the historical travel data includes popular origin/destination pairs;

selecting a reference origin/destination pair that matches the current operation from among the popular origin/destination pairs based on the current time and a type of the missing point, the type indicating whether the missing point is an origin or a destination;

identifying the missing point based on the reference origin/destination pair;

in response to the missing point being a destination, selecting a popular destination from among the popular origin/destination pairs as the missing point, such that the time associated with the selected popular destination is immediately adjacent to the time associated with an origin in the reference origin/destination pair; and granting access, by the processing circuit at the gate at the terminal to the user, based on identifying the missing point.

\* \* \* \* \*